Feb. 28, 1950     W. A. DUFFIELD     2,498,797
SPEED VARYING TRANSMISSION
Filed July 12, 1944     2 Sheets-Sheet 2
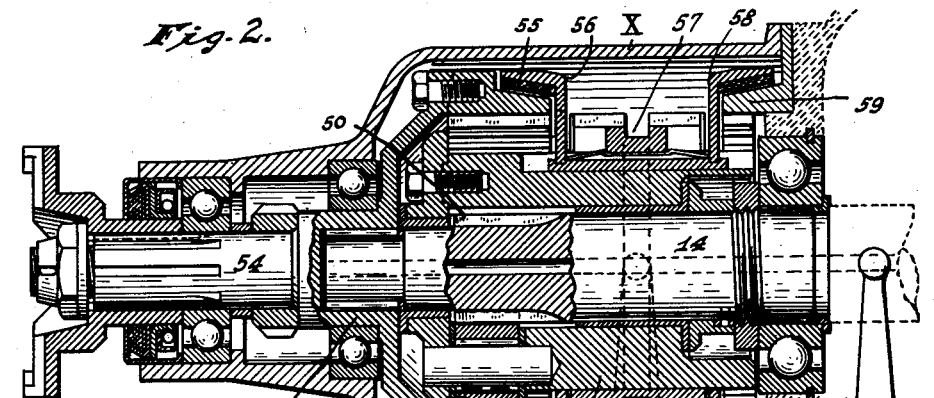
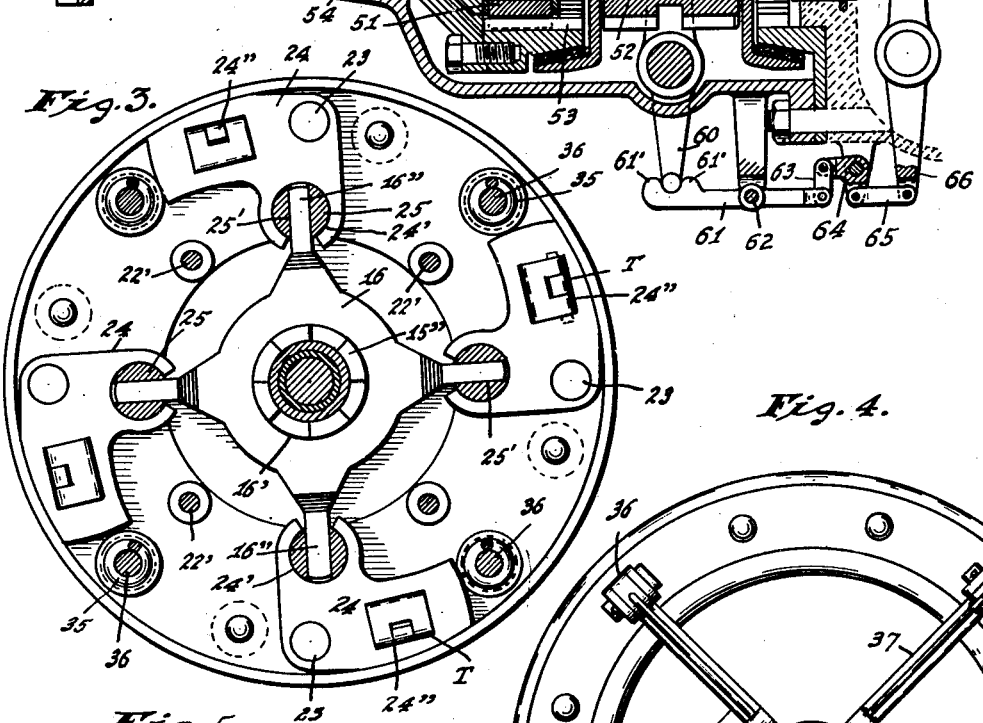
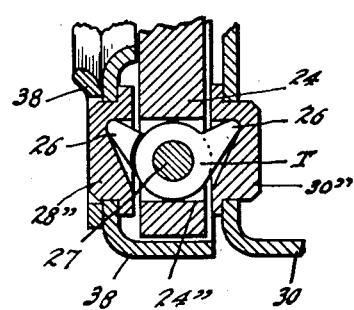
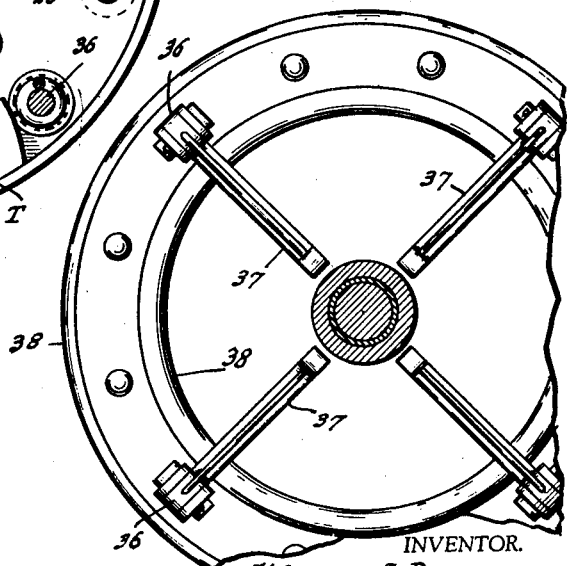
INVENTOR.
WILLIAM A. DUFFIELD,
Hood & Hahn
ATTORNEYS.

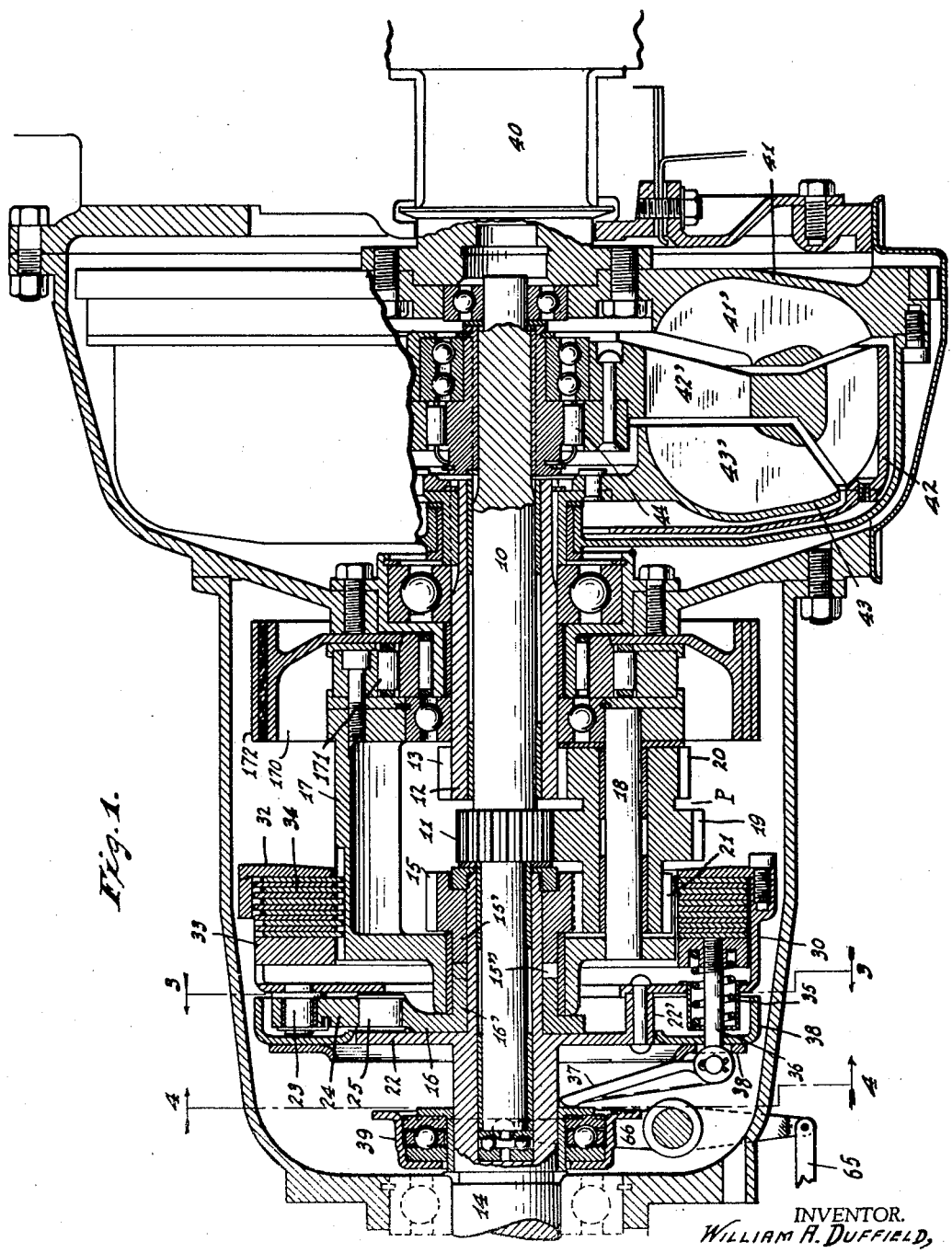

Patented Feb. 28, 1950

2,498,797

UNITED STATES PATENT OFFICE 2,498,797

SPEED VARYING TRANSMISSION

William A. Duffield, Windsor, Ontario, Canada, assignor, by mesne assignments, to Windfields 1946 Limited, Montreal, Quebec, Canada, a corporation of Canada Application July 12, 1944, Serial No. 544,507

16 Claims. (Cl. 74—677)

The object of my invention is to provide an automatic speed-varying transmission unit having a normal at rest high-speed coordination and automatically responsive to a predetermined differential between input torque and output torque to determine the gear ratio at which the unit will function.

The accompanying drawings illustrate my invention.

Fig. 1 is an axial section of an embodiment of my invention;

Fig. 2 is an axial section of reversing and idling means supplementing my invention;

Fig. 3 is a section on line 3—3 of Fig. 1;

Fig. 4 is a section on line 4—4 of Fig. 1; and

Fig. 5 is a fragmentary section through one of the clutch-controlling toggles.

My transmission unit in its preferred form comprises, fundamentally, two input sun gears, an output sun gear, a planet gear unit meshing simultaneously with said sun gears, a carrier for said planet gear unit, an output shaft, a clutch normally connecting said carrier and output shaft for unitary rotation, and a connection between the output sun gear and said clutch responsive to a predetermined differential between input torque and load torque applied to the output shaft to disconnect the normal clutch connection between the planet carrier and the output shaft.

Referring to the drawings, 10 indicates an input shaft provided with the input sun gear 11. Sleeved upon shaft 10 is a sleeve shaft 12 provided with the input sun gear 13. Sleeved upon shaft 10 is output shaft 14, upon the inner end of which is sleeved the output sun gear 15, having a hub 15' connected to the hub 16' of a spider 16 sleeved on output shaft 14 and connected to hub 15' by a jaw clutch 15''.

Journalled on shaft 12 and hubs 15', 16' is a planet carrier 17 carrying a plurality of circumferentially spaced planet shafts 18 upon each of which is journalled a planet gear unit P comprising three gears 19, 20 and 21 meshing, respectively, with sun gears 11, 13 and 15. Coaxial with carrier 17 is a brake drum 170 between which and carrier 17 is interposed a one-way clutch 171 which will prevent reverse rotation of carrier 17 whenever drum 170 is held against rotation by a manually controllable brake band 172.

Output shaft 14 is provided with a circumferential flange 22 provided with a plurality of circumferentially spaced pins 22' to which is secured the clutch shell 30 having circumferentially spaced pins 23, upon each of which is pivoted a bell-crank lever 24 one arm of each being projected radially inwardly and provided with a pocket 24' in which is journalled a pin 24 having a diametrical slot 25' into which is projected a radial finger 16'' of spider 16. The other arm of each lever 24 is projected tangentially relative to flange 22 and is provided with a pocket 24'' in which is nested toggle T comprising two lever arms 26, 26 pivoted together at 27. The opposite projecting free ends of arms 26, 26 are nested, respectively, in blocks 28'' and 30''.

Blocks 30'' are rotatively supported in pockets formed in the clutch shell 30 which is coaxial with carrier 17, and blocks 28'' are mounted in the fulcrum ring 38. Shell 30 is provided with an abutment ring 32 and a pressure ring 33 between which are interdigitated friction rings 34, of well known form, splined alternately to shell 30 and carrier 17. Ring 33 is urged to clamping position by circumferentially spaced springs 35 carried by shell 30 and is provided with a plurality of circumferentially spaced pull rods 36 to the outer end of each of which is connected a lever 37 the inner end of which is projected radially toward the axis of shaft 10. Ring 38 floats on the left-hand (Fig. 1) ends of toggles T, being urged thereon by springs 35, pins 36 and levers 37.

The levers 37 overlie the fulcrum ring 38 and their inner ends are engaged by a shift-collar 39 on output shaft 14 the arrangement being such that when collar 39 is shifted to the right (Fig. 1) pressure ring 33 is withdrawn from the clutch rings 34 and the normal connection between carrier 17 and output shaft 14 is rendered ineffective. When the toggle carrying arms of levers 24 are moved inwardly, the toggles T, acting on fulcrum ring 38, also serve to withdraw pressure ring 33 from clutch rings 34 to render ineffective the clutch connection between carrier 17 and output shaft 14.

In order to provide input torque to the two input sun gears, I prefer the following mechanism:

The power source shaft 40 carries the impeller 41 of a fluid coupling which also comprises a first runner 42 and a second runner 43, said impeller and runners having axially vaned passages 41', 42' and 43' so arranged that the torroidal flow of the coupling fluid will be from impeller 41, through runner 43, and thence through runner 42 back to the impeller, so that the drive exerted by impeller 41 will be primarily upon runner 42 and secondarily upon runner 43.

Runner 42 is connected to input shaft 10 through the medium of a one-way clutch 44 which will permit shaft 10 to run forwardly at a speed exceeding that of runner 42. Runner 43 is splined upon the input shaft 12.

Operation is as follows:

Rotation of impeller 41 exerts a fluid drive on runner 42 and, through runner 42, upon runner 43.

Initial torque flow will be 41, 42, 10, 11, 19, 21, 15, 16, 16", 24, 23, 30, 22, 14. It will be noticed that the force applied to 24 from 16' tends to swing the toggle arms of 24 inwardly and that if such movement occurs the clutch connection between 17 and 14 will be disrupted. If the differential between input torque and load torque is not too great, however, the clutch connection between 17 and 14 will persist and the load will be picked up by the transmission acting as a unit in 1 to 1 ratio, except for the fluid slip between 41 and 52.

If the operator depresses his accelerator lever enough to produce a torque differential as much as the force required to break the clutch connection between 17 and 14 the torque flow will be either 41, 42, 10, 11, 19, 21, 15, 16, etc., or 41, 42, 43, 12, 13, 20, 21, 15, 16, etc., or both, depending upon the amount of that differential and the speeds of the first and second runners relative to each other and to the impeller, so that transmission will be through the unit at less than a 1 to 1 ratio.

As the speed of the load picks up, centrifugal forces acting on levers 24 to tend to swing the toggle-bearing ends of lever 24 outwardly to restore the clutch connection between 17 and 14.

It will be apparent, therefore, that there is a constant tendency in the apparatus to assume a 1 to 1 driving ratio and that, although, at all times, the operator, by proper manipulation of his accelerator lever, may influence the gear ratio at which the unit will function, nevertheless the unit will automatically adjust itself to the gear ratio which is most efficient for the load at the instant torque differential.

Any desired means may be provided to transmit power from the output shaft to an ultimate tail shaft selectively for forward or reverse drive. In the drawings I have illustrated a well known form of synchronizing selective means which also affords a neutral relation.

Output shaft 14 carries a gear 50 which meshes with a planet gear 51 carried by a carrier 52 journalled on shaft 14. Gear 51 meshes with an internal orbit gear 53 carried by tailshaft 54 and provided with a friction drum 55 mated by the synchronizing ring 56.

Splined on carrier 52 is the clutch collar 57 having peripheral teeth capable of interlocking with the teeth of the orbit gear 53 and also capable of penetrating ring 56. A second synchronizing ring 58 mating a fixed friction drum 59 carried by casing X also coacts with clutch collar 57. When these parts are in the positions shown in Fig. 1, carrier 52 is free to rotate so that planet gear 51 rotates and revolves freely within the orbit gear without transmitting substantial torque to the tailshaft. When clutch collar 57 is shifted to the left, Fig. 2, it is first synchronized with, and then enters, gear 53 to clutch the carrier 52 and the tailshaft together for forward drive. When collar 57 is shifted to the right, Fig. 1, carrier 52 is tied to casing X and reverse drive is obtained through the gear 51.

The requisite connection between the output shaft and tailshaft may be widely varied without departing from my invention, and the mechanism just described for this purpose forms no part of my present invention.

The clutch connection between the planet carrier 17 and output shaft 14 preferably should be disestablished when shifting from neutral to forward or reverse and various arrangements may be provided to this end.

For instance, a manually controllable lever 60 for clutch 57 may engage either of two lugs 61' on a lever 61 pivoted at 62 and connected by link 63 to one arm of a bell crank lever 64 connected by link 65 to a lever 66 acting on collar 39, and serves to momentarily release the clutch mechanism between 17 and 14 as clutch 47 passes from neutral position to either forward or reverse position.

It should be noted (Fig. 5) that toggles T are placed with the outer ends of lever arms 26 directed inwardly toward the axis of shaft 10 so that the pivotal junction between lever arms 26 is capable of exerting an outward thrust on the weighted arm of element 24 serving to swing said element 24 about its pivot 23 to its outward limit (Fig. 3), when fulcrum ring 38 is moved toward shell 30 by springs 35, due to the fact that the force of said springs tends to move the outer ends of lever arms 26 (Fig. 5) toward each other and thus force the pivotal junction of said lever arms outwardly relative to the axis of shaft 10.

I claim as my invention:

1. In a variable-speed transmission, two independently actuatable input gears, an output gear, a planetary gear unit including a unitary toothed element meshing with said three gears to interlock the same, a rotatable carrier for said planetary gear, means for locking said carrier against reverse rotation, a clutch interposed between said carrier and output gear and normally biased to clutch position, an output shaft, and means interposed between said output gear and output shaft for actuating said clutch in opposition to its bias.

2. Apparatus of the character specified in claim 1, where in the connection between the output gear and output shaft comprises a yieldable connection between the output gear and the output shaft responsive to a differential between input torque and load torque and associated with means for releasing the clutch in response to overpowering input torque.

3. Apparatus of the character specified in claim 1 and including a tailshaft, reversing gearing, means for selectively coupling the output gear with the tailshaft with or without interposition of the reversing gearing, and means actuated by said selective means for temporarily releasing the clutch between the planet carrier and output gear in transition to and from an intermediate position of said selective means.

4. Apparatus of the character specified in claim 1 and including a fluid coupling comprising an impeller and two runners with one runner connected to one input gear through a one-way clutch and the other connected to the other input gear, a tailshaft, reversing gearing, means for selectively coupling the output gear with or without interposition of the reversing gearing, and means actuated by said selective means for temporarily releasing the clutch between the planet carrier and output gear in transition to and from intermediate position of said selective means.

5. In a variable-speed transmission, two independently actuatable input sun gears, an output sun gear, a planetary gear unit comprising a unitary toothed element meshing with said three gears, a carrier for said planetary gear coaxial with the sun gears, a clutch interposed between said carrier and output gear and normally biased to clutching position, an output shaft, and means interposed between said output gear and output shaft for actuating said clutch in opposition to its bias.

6. Apparatus of the character specified in claim 5, wherein the connection between the output gear and output shaft comprises a yieldable connection responsive to a differential between input torque and load torque and associated with means for releasing the clutch in response to overpowering input torque.

7. Apparatus of the character specified in claim 5, wherein the connection between the output gear and output shaft comprises a yieldable connection between the output gear and output shaft associated with means for releasing the clutch in response to overpowering input torque, and including a tail shaft, reversing gearing, means for selectively coupling the output shaft with the tail shaft with or without interposition of the reversing gearing, and means actuated by said selective means for temporarily releasing the clutch between planet carrier and output gear in transition to and from an intermediate position of said selective means.

8. Apparatus of the character specified in claim 5, and including a fluid coupling comprising an impeller and two runners with one runner connected to one sun gear through a one-way clutch and the other runner connected to the other sun gear, a tailshaft, reversing gearing, means for selectively coupling the output gears with or without interposition of the reversing gearing, and means actuated by said selective means for temporarily releasing the clutch between the planet carrier and output gear in transition to and from intermediate position of said selective means.

9. A speed-varying transmission comprising two independently actuatable input gears, an output gear, gears meshing with said three gears and providing one ratio train between one input gear and the output gear and a second ratio train between the other input gear and the output gear, an output shaft, a clutch normally biased to couple the input gears and output gear as a unit to the output shaft, and means interposed between the output gear and output shaft responsive to a predetermined differential between input torque and output torque to actuate said clutch in opposition to its bias, a tailshaft, reversing gearing, means for selectively coupling the output shaft with the tailshaft with or without interposition of the reversing gearing, and means actuated by said selective means for temporarily releasing the clutch in transition to and from an intermediate position of said selective means.

10. A speed-varying transmission comprising two independently actuatable input gears, an output gear, gears meshing with said three gears and providing one ratio train between one input gear and the output gear and a second ratio train between the other input gear and the output gear, an output shaft, a clutch normally biased to couple the input gears and output gear as a unit to the output shaft, and means interposed between the output gear and output shaft responsive to a predetermined differential between input torque and output torque to actuate said clutch in opposition to its bias, a fluid coupling comprising an impeller and two runners with one runner connected to one input gear through a one-way clutch and the other runner connected to the other input gear, a tailshaft, reversing gearing, means for selectively coupling the output shaft with the tailshaft with or without interposition of the reversing gearing, and means actuated by said selective means for temporarily releasing the biased clutch in transition to and from an intermediate position of said selective means.

11. In a variable-speed transmission, two input members to which power may be applied, an output member, a speed reduction train between one of said input members and the output member, a speed reduction train between the other of said input members and the output member, a clutch normally biased to unify the connection between said input members and output member, means responsive to a predetermined difference between input torque and load torque to actuate said clutch in opposition to its bias, a tailshaft, reversing gearing, means for selectively coupling the output member with the tailshaft with or without interposition of the reversing gearing, and means actuated by said selective means for temporarily releasing the biased clutch in transition to and from an intermediate position of said selective means.

12. In a variable-speed transmission, two input members to which power may be applied, an output member, a speed reduction train between one of said input members and the output member, a speed reduction train between the other of said input members and the output member, a clutch normally biased to unify the connection between said input members and output member, means responsive to a predetermined difference between input torque and load torque to actuate said clutch in opposition to its bias, a fluid coupling comprising an impeller and two runners with one runner connected to one input member through a one-way clutch and the other runner connected to the other input member, a tailshaft, reversing gearing, means for selectively coupling the output member with the tailshaft with or without interposition of the reversing gearing, and means actuated by said selective means for temporarily releasing the biased clutch in transition to and from an intermediate position of said selective means.

13. In a speed change gearing of the type comprising an input sun gear, a coaxial output gear, a planet unit gear meshing with said input and output gears, a tail shaft, a carrier for said planet gear coaxial with the input and output gears, and a clutch between the carrier and tail shaft; means yieldingly biasing said clutch to active position, a centrifugally sensitive weight between said clutch and tail shaft to partake of tail-shaft speed, a toggle carried by said weight and abuting said tail shaft and clutch in opposition to the clutch-biasing means and so positioned that movement of the toggle toward the axis of input and output gears will overcome said biasing means to render the clutch ineffective, and a connection responsive to forward movement of the output gear relative to the tail shaft to shift said toggle to overcome the clutch biasing means.

14. Apparatus of the character specified in claim 13 and including means, independent of the centrifugally sensitive weight, to overcome the clutch-biasing means and render the clutch ineffective.

15. In a variable-speed transmission, two independently actuable input gears, an output gear, a planetary gear unit meshing with said three gears, a rotatable carrier for said planetary gear, means for locking said carrier against reverse rotation, a clutch interposed between said carrier and output gear, means normally biasing said clutch to engaged condition, an output shaft, and means providing a driving connection between said output gear and said output shaft, said last-named means including a first element movable with said output gear, a second element movable with said output shaft and movable relative to said output shaft, said elements being drivingly connected, and means actuated by movement of said second element relative to said output shaft under the influence of power applied thereto by said first element, to disengage said clutch.

16. In a variable-speed transmission, two independently actuable sun gears, an output sun gear, a planetary gear unit meshing with said three gears, a carrier for said planetary gear coaxial with the sun gears, a clutch interposed between said carrier and output gear, means normally biasing said clutch to engaged condition, an output shaft, and means providing a driving connection between said output gear and said output shaft, said last-named means including a first element movable with said output gear, a second element movable with said output shaft and movable relative to said output shaft, said elements being drivingly connected, and means actuated by movement of said second element relative to said output shaft under the influence of power applied thereto by said first element, to disengage said clutch.

WILLIAM A. DUFFIELD.

REFERENCES CITED

The following references are of record in the file of this patent:

UNITED STATES PATENTS

| Number | Name | Date |
| --- | --- | --- |
| 1,158,555 | Prescott | Nov. 2, 1915 |
| 1,795,464 | Banker | Mar. 10, 1931 |
| 1,813,372 | Wildhaber | July 7, 1931 |
| 1,837,908 | Kamper | Dec. 22, 1931 |
| 2,064,646 | Baule | Dec. 15, 1936 |
| 2,076,974 | Alspaugh | Apr. 13, 1937 |
| 2,122,218 | Sneed | June 28, 1938 |
| 2,188,246 | Mirone | Jan. 23, 1940 |
| 2,316,390 | Biermann | Apr. 13, 1943 |
| 2,326,994 | Duffield | Aug. 17, 1943 |
| 2,343,955 | Cotterman | Mar. 14, 1944 |
| 2,355,427 | Duffield | Aug. 8, 1944 |
| 2,373,234 | Duffield | Apr. 10, 1945 |